(No Model.)

E. TUSH.
GRINDING MILL.

No. 266,225. Patented Oct. 17, 1882.

Witnesses.
Edwin L. Yewell.
J. J. McCarthy.

Inventor:
Elwood Tush.
E. M. Alexander
Attorney.

UNITED STATES PATENT OFFICE.

ELWOOD TUSH, OF MANCHESTER, IOWA.

GRINDING-MILL.

SPECIFICATION forming part of Letters Patent No. 266,225, dated October 17, 1882.

Application filed July 25, 1882. (No model.)

*To all whom it may concern:*

Be it known that I, ELWOOD TUSH, of Manchester, in the county of Delaware, and in the State of Iowa, have invented certain new and useful Improvements in Grinding-Mills; and I do hereby declare that the following is a full, clear, and exact description thereof, reference being had to the accompanying drawings, and to the letters of reference marked thereon, making a part of this specification.

This invention has for its object to provide a certain improved apparatus or machine by means of which grain of various descriptions may first be crushed and then ground to any desired degree of fineness, as more fully hereinafter described. This object I attain by the means illustrated in the accompanying drawings, in which—

Figure 1:
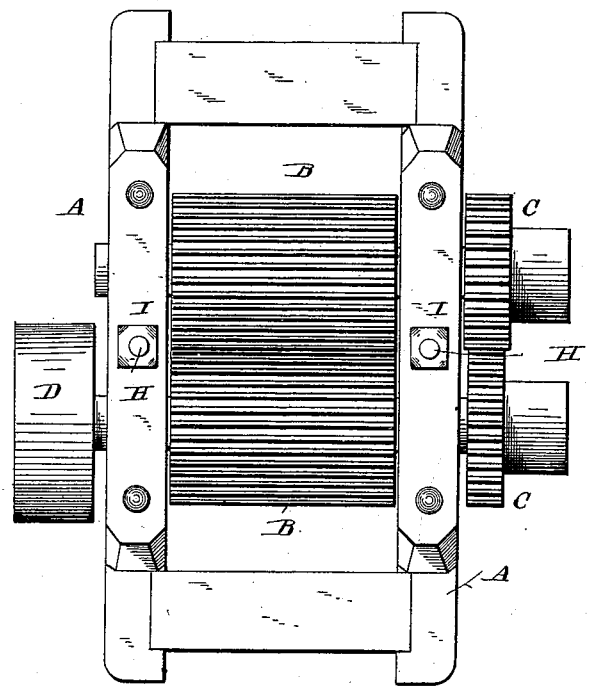
Figure 2:
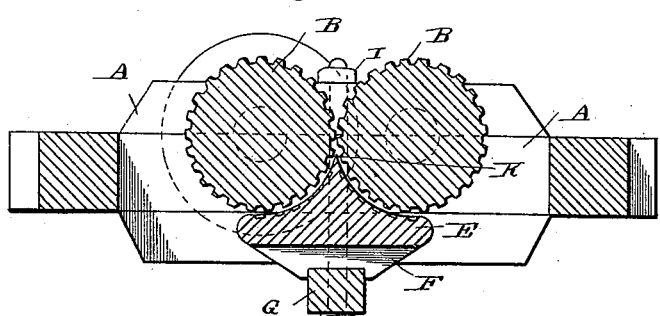

Figure 1 represents a top view of my improved machine; Fig. 2, a longitudinal vertical section thereof, and Fig. 3 a detached view of a double concave of the machine.

The letter A indicates a substantial frame, constructed of any suitable material, and B two longitudinally-corrugated rolls, having their shafts journaled in suitable bearings in the frame. The journals at one side of the frame project therefrom and are provided with intermeshing cog-wheels C, and the journal of one of the rolls projects on the opposite side of the frame and is provided with a pulley, D, by means of which the rolls may be put in motion.

Figure 3:
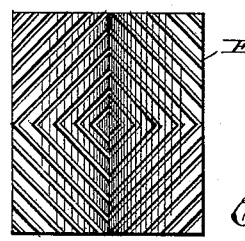

Below the rolls is located a double concave, E, which is supported upon a seat, F, secured to a cross-beam, G, which is adjustably secured to the frame by means of the screw-bolts H and the nuts I. The double concave E is provided with curved grinding-faces, which faces conform to the peripheries of the rolls, the central portion of the double concave being formed with a sharp edge, K, which extends up between the rolls. The grinding-faces of the said double concave E are corrugated obliquely from a central line to each side, as indicated in Fig. 3 of the drawings. These corrugations or ridges have a square section, and have therefore sharp corners, which act, in combination with the corrugations on the rolls, to cut the grain, after the manner of a pair of shears, into small particles, and the closer the double concave is adjusted to the rolls the finer these particles will be.

The grain to be ground is passed first between the rollers, after the same have been put in motion, which crushes or mashes the grain. The body of grain is then divided by the sharp edge of the double concave E, and is carried between the grinding-faces and the rolls, by means of which it is effectually ground.

I am aware that rolls have been made with corrugations having a square section. I do not claim this construction; but I do claim—

In a roller-mill, the double concave E, having its grinding-faces cut into ridges inclined toward each other at an angle of about forty-five degrees to its upper edge, K, said ridges having a square section, in combination with the longitudinally-corrugated rolls B, substantially as shown and described, and for the purposes set forth.

In testimony whereof I affix my signature, in presence of two witnesses, this 28th day of June, 1882.

ELWD. TUSH.

Witnesses:
D. R. LEWIS,
J. J. REUTONY.